March 16, 1943.  J. KÖNIG  2,314,222

METHOD AND MEANS FOR PROJECTING IMAGES WITH FLICKERING EFFECT

Filed Aug. 13, 1941  3 Sheets-Sheet 1

INVENTOR
JOSEPH KÖNIG

March 16, 1943.   J. KÖNIG   2,314,222

METHOD AND MEANS FOR PROJECTING IMAGES WITH FLICKERING EFFECT

Filed Aug. 13, 1941   3 Sheets-Sheet 2

INVENTOR
JOSEPH KÖNIG
By Walhauster Groff
Attys

March 16, 1943.  J. KÖNIG  2,314,222
METHOD AND MEANS FOR PROJECTING IMAGES WITH FLICKERING EFFECT
Filed Aug. 13, 1941  3 Sheets-Sheet 3
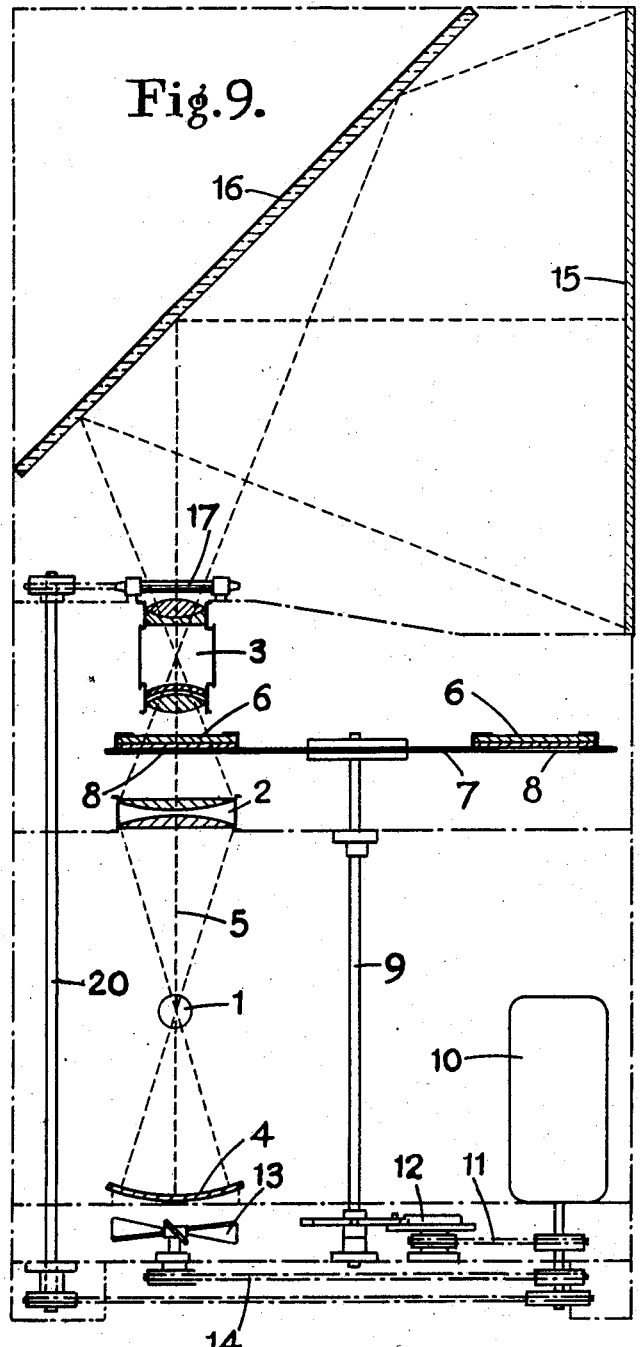
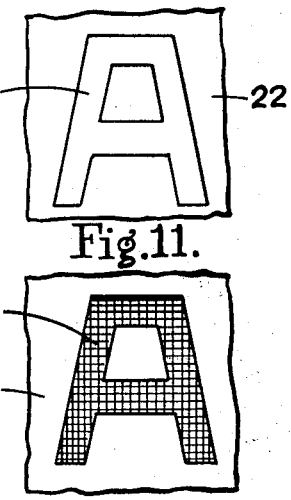
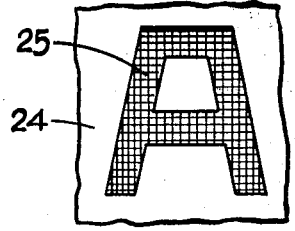
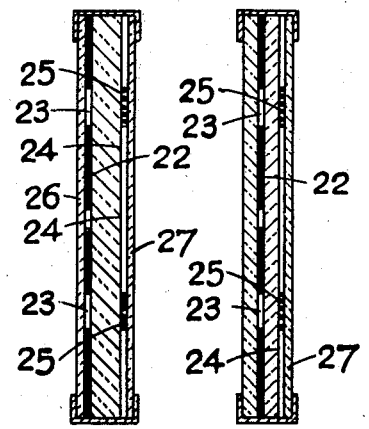
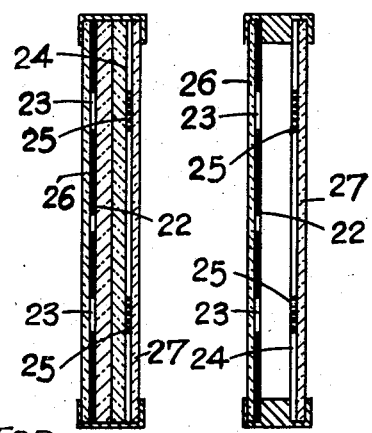
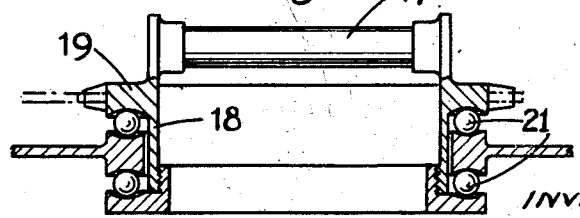
INVENTOR
JOSEPH KÖNIG Patented Mar. 16, 1943

2,314,222

UNITED STATES PATENT OFFICE 2,314,222

METHOD AND MEANS FOR PROJECTING IMAGES WITH FLICKERING EFFECT

Joseph König, London, England

Application August 13, 1941, Serial No. 406,716
In Great Britain December 3, 1940

10 Claims. (Cl. 88—24)

This invention relates to a method of and apparatus for projecting black and white or colored pictures and the like on to a screen in which certain areas of the projected pictures are given a flickering effect, although the transparency through which the light is projected is stationary.

The invention consists in passing a beam of light through a condenser, a composite slide, and a focussing device on to a screen, said composite slide comprising a main transparency of the whole picture and a supplemental transparency containing counterparts of those areas of the main transparency which are intended to flicker formed as areas broken up into numerous divisions for splitting the beam into smaller beams, the two transparencies being disposed in spaced relationship, with the main transparency in register with its counterparts on the supplemental transparency, focussing the image of the first transparency, and producing flickering of said smaller beams by applying and operating a movable element disposed in the light path.

In one embodiment of the invention the method of breaking up the areas of the counterparts on the supplemental transparency is by forming thereon numerous projections or raised elements capable of refracting the beams and splitting them into smaller beams, each of the refracting projections on the supplemental transparency producing a concentrated stationary spot of light due to a stationary beam and a moving spot of light due to, and following the movements of, a moving beam, whereby a flickering effect is obtained. In this instance, the movable beam is preferably produced by a movable focussing reflector arranged behind the source of light producing the stationary beam, its movement changing the direction of the reflected beam with respect to the optical axis of the stationary beam. In one preferred form of construction the reflector is arranged to rotate eccentrically with respect to the optical axis of the stationary beam.

The vividness of the flickering effect may be increased by the provision of a third transparency similar to the second one and arranged close behind it.

In a further embodiment of the invention, the supplemental transparency is modified in that it is provided, opposite the flicker areas of the first transparency, with counterpart areas split up into numerous clear and opaque lines or stipples, i. e. in two-dimensional form as distinct from the three-dimensional form of refracting projections used in the first instance. The word "opaque" is used in the wide sense to mean the application of black, grey, or other coloring matter or other treatment to the transparency to such a degree or in such a way that all or most of the light intercepted by the said opaque dividing lines or stipples will be prevented from passing therethrough. These lines or stipples are given any suitable straight, curved, wavy, variegated, hatched, checker or reticulated form, either coarse or fine according to the nature of the flickering effect aimed at, and are formed on the transparency preferably by photography, or alternatively by drawing, etching or other suitable means. For example, the said areas may be similar to the screens used in reproducing photographs in half-tone.

A stationary beam of light alone may be passed through the condenser, composite slide and focussing device, and the flickering effect obtained by inserting a movable light interceptor between the objective lens and the projection screen. So long as the image of the main transparency is focussed sharply on the screen and the supplementary transparency is spaced from the first sufficiently for its image to be slightly out of focus, the movement of the said light interceptor will produce a flicker of the light spots projected by the sub-divisions of the second transparency. This interceptor may be a transparent light refractor, such as a glass cylinder rotatable on an axis perpendicular to its own axis and coincident with the optical axis of the system, or it may be an opaque shutter of suitable form in which case its movement would be set at a speed sufficiently high to prevent any noticeable effect, by the occultation, on the projected image as a whole, while giving the desired flicker effect to the projected spots.

The accompanying drawings illustrate, by way of example, some ways of carrying the invention into effect. In the drawings Figure 1 shows diagrammatically in plan view the general arrangement of one embodiment of an apparatus employed;

Figure 9 shows diagrammatically in elevation the general arrangement of another embodiment;

Figures 10 and 11 show respectively part of the first or main transparency and of the second or supplemental transparency;

Figures 12, 13, 14 and 15 are sectional diagrams of four different ways of making the composite slide described with reference to Figures 10 and 11;

Figure 16 is an elevation on a larger scale than that used in Figure 9 of a movable refractive light interceptor used in the embodiment according to Figure 9.

Figure 1:
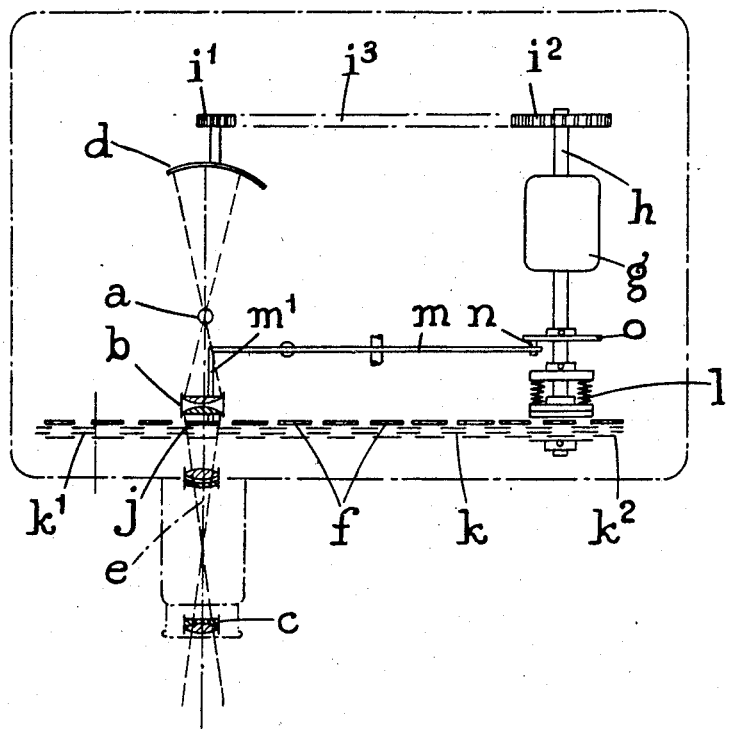
Figure 2:
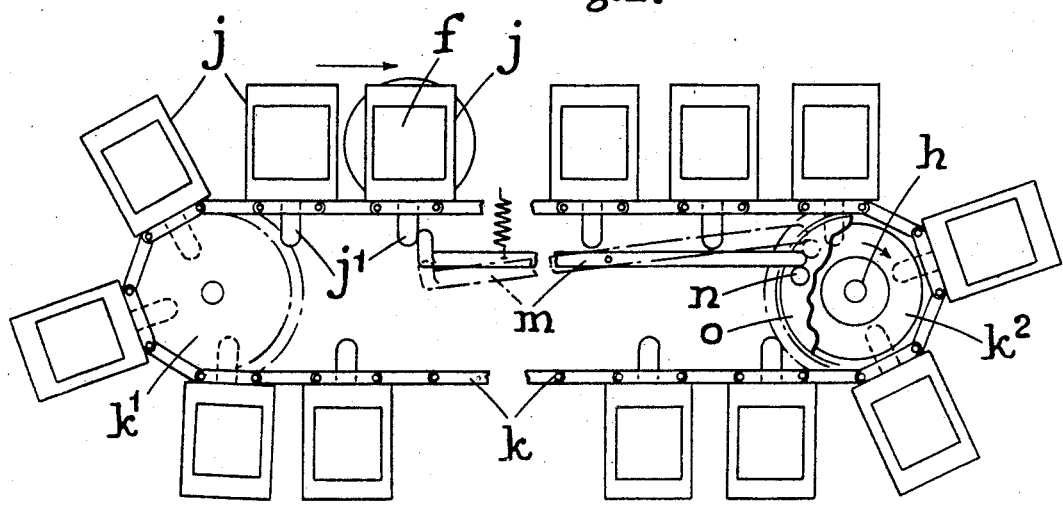
Figure 2 shows in elevation one type of feeding arrangement of the slides on which the transparencies are mounted.

Reference will now be made to the embodiment shown in Figures 1 and 2. In this embodiment both a stationary and a movable beam of light are used, and the numerous divisions (into which the counterparts of the flicker area are broken) consist of refractive projections or raised elements. In these figures, which show a general arrangement of the projector apparatus, $a$ is a stationary source of light, $b$ the usual condenser and $c$ the objective forming part of the focussing device. $d$ is a rotary focussing reflector eccentrically mounted with respect to the optical axis $e$ of the lantern. $f$ is the composite slide comprising the two transparencies adapted to be automatically fed into position between the condenser and objective. $g$ is an electric motor mounted on a shaft $h$ by means of which the reflector $d$ is rotated by sprocket wheels and endless chain $i^2$, $i^2$, $i^3$.

The slide feeding mechanism is also operated by the motor $g$, the shaft $h$ of which is adapted to effect such operation intermittently. The slides $f$ which may represent different advertisements, are mounted in slide holders $j$ suitably secured to the individual links of an endless chain $k$ mounted on two sprocket wheels $k^1$, $k^2$. The sprocket wheel $k^2$ is loosely mounted on the motor shaft $h$ and adapted to be rotated by it through the intermediary of a friction clutch $l$ as soon as a slide holder is freed from its locked position. The locking and unlocking of the slide holders is effected by means of a spring-controlled lever $m$ operated by an abutment $n$ provided on a disc $o$ secured to the motor shaft $h$. During each revolution of the disc $o$, the abutment acts once on the lever $m$ to displace it and thereby cause a projection $m^1$ in engagement with a lug $j^1$ on the slide holder $j$ to be disengaged therefrom. As soon as the slide holder $j$ is thus released, the sprocket wheel $k^2$, which up to that moment was prevented from rotation, is taken along by the friction clutch $l$, thereby moving the endless chain $k$ together with the slide holders thereon. When the next slide holder arrives in the right position the lever $m$ is released by the abutment $n$ and is brought again into its locking position.

Figure 4:
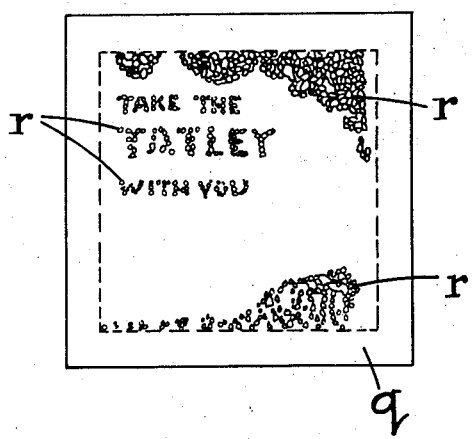
Figures 3 and 4 show a front view of an example of the main and supplemental transparencies respectively.
Figure 3:
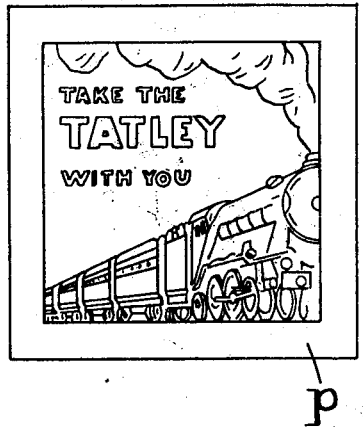
Figure 5:
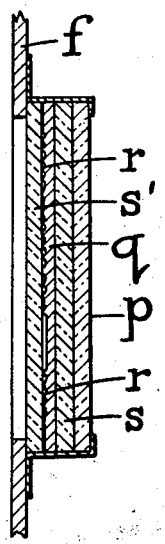
Figure 5 is a sectional elevation of the composite slide comprising the two transparencies.

Referring to Figures 3 to 5, $p$ is the transparency of the whole picture to be projected, and $q$ the transparency which produces the flickering effect. The transparency $p$ is made of glass in a manner well known with lantern slides, the advertisement being depicted thereon in black and white or in any desired color. The second transparency $q$ may also be of glass, but it preferably consists of a thin sheet of transparent plastic, e. g. Celluloid. This transparency comprises only the flicker portions of the picture, in the form of numerous small projections or raised pimple-like elements $r$ of lenticular or like shape obtained by means of an embossing block. The black lines seen in Figure 4 of the drawings of the transparency $q$ do not actually appear as black lines on the transparency; they are simply the boundaries of the refracting projections. The two transparencies are assembled together, at such a distance as required by the optical characteristics of the projections or raised elements $r$, as a single composite slide $f$, shown in Figure 5, with the embossed portions of the second transparency lying exactly opposite the corresponding illustrated parts on the first transparency. In Fig. 5, $s$ is a sheet of glass interposed between the two transparencies and $s^1$ is another sheet of glass provided as a protection.

Figure 6:
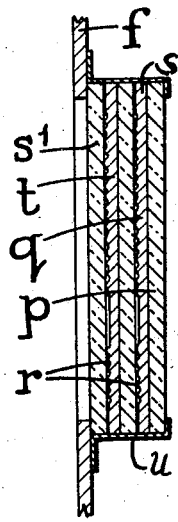
Figure 6 is a sectional elevation of a modification of the slide in which the flickering effect is increased by the use of a third transparency similar to the supplemental one.

The flickering effect, which is produced by the rotation of the eccentrically mounted focussing reflector $d$, may be increased in its vividness by providing a further transparency similar to the second one behind the latter, as shown in Figure 6, in which $t$ is the additional transparency separated from the transparency $q$ by a sheet of glass $u$.

Figure 7:
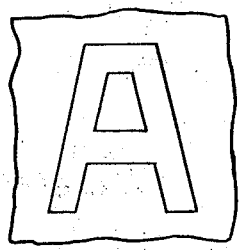
Figures 7 and 8 show a part of an original drawing from which the transparencies are produced.
Figure 8:
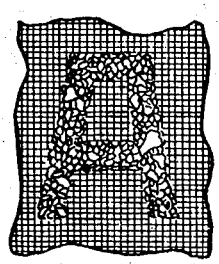

Figures 7 and 8 are intended to illustrate in a simple example how the original drawings of two transparencies as used in the present invention are respectively produced. The letter A is supposed to be the part intended to flicker in a picture which comprises other parts. In the drawing shown in Figure 7, intended for the production of the first transparency, the whole surface is white with the exception of the delineations of the letter, which are black, it being understood that this drawing includes also the other parts of the illustration which are not intended to flicker. In the drawing shown in Figure 8, intended for the second transparency, the whole of the surface with the exception of delineations of the actual letter is black, and the latter is filled up by numerous small white circles or the like, as shown.

The two drawings, Figures 7 and 8, are photographed and a dispositive (first or main transparency) is obtained from the negative of the one (Figure 7) and an embossing block from the negative of the other one (Figure 8) which is then used for the making of the second or supplemental transparency with raised elements.

The screen, not shown in the drawings, may be provided at any desired distance from the focussing device, according to the required enlargement of the flickering device.

Instead of using an eccentrically mounted reflector, use may be made of a reflector mounted concentrically with respect to the optical axis and comprising a plurality of smaller focussing reflectors. The other details of construction may be modified without departing from the essence of the invention.

In the embodiment illustrated in Figure 9, 1 is a stationary source of light, 2 the condenser and 3 the focussing device. 4 is a stationary reflector mounted on the optical axis 5 of the system. 6 is the composite slide (comprising the two transparencies described later in greater detail) adapted to be automatically fed or intermittently interposed into position between the condenser 2 and focussing device 3.

A plurality of the composite slides 6 is carried by a rotatable disc 7 which is formed with a circular line of openings 8 adapted to be brought successively into register with the optical axis 5 as the disc 7 is rotated. The said disc is given a step-by-step movement by the shaft 9 which is driven by a motor 10 through the chain 11, a Maltese wheel or equivalent device 12 being interposed to impart the step-by-step movement. A cooling fan 13 may be embodied in the apparatus and this can be driven from the motor 10 such as by the chain 14. This is a convenient method of bringing into projection a succession of slides 6, particularly in a self-contained display apparatus carrying its own translucent projection screen 15 mounted in an opening in, or forming, one of the walls of the apparatus. Any other suitable form of slideholder and operating mechanism may be used such for example as that depicted in the previous example described with reference to Figure 1.

In the arrangement shown by the illustrated embodiment, the optical axis 5 is vertical and upwardly directed on to a mirror 16 from which the image is projected horizontally on to the screen 15, but it will be realised that the system can easily be adapted for projection on to a screen in a variation of the apparatus where the parts are disposed so that Figure 9 would be a plan view. Also the system might very well be arranged to project its picture on to the front of a distant screen.

Between the focussing device 3 and the screen is interposed a movable light interceptor 17 which in this case is an element designed to refract the rays. This refractive interceptor 17 is seen more clearly in Figure 16. This is a cylinder 17 of glass mounted to revolve in a fixed carrier 18, a sprocket 19 being included as part of the revoluble body of the interceptor. The axis of revolution coincides with the optical axis 5, i. e. perpendicular to the axis of the glass cylinder 17. This interceptor is driven to rotate at any suitable speed by any suitable means, and as an example it is shown being driven by a spindle 20 in turn driven from the motor 10. It is mounted to run smoothly in bearings depicted generally at 21.

Refering to Figures 10–15 inclusive, the composite slide 6 consists of a first or main transparency 22 carrying a representation of the whole picture or sign of which an area or areas 23 is (or are) intended to flicker when the image is projected. This main transparency is faced with a supplemental transparency 24 having an area or areas 25 adapted to register with the flicker area or areas 23. The respective drawings for the two transparencies and their interrelation are explained more fully later herein. The (or each) area 25 is split up into numerous clear and opaque divisions by opaque lines or stipples indicated by the criss-cross lines of Figure 11. The pair of transparencies are spaced apart sufficiently so that when light is projected through the composite slide 6 and the image of the main transparency 22 is brought into focus, the supplemental transparency 24 is consequently slightly out of focus. The thickness of a usual glass slide is sufficient for this purpose, and Figure 12 shows a single slide faced on each of its surfaces with the respective transparencies 22 and 24. In Figure 13 two slides are used, one carrying the main transparency on one of its faces, and the other carrying the supplemental transparency on one of its faces; they are placed together in contact, with one of the transparencies (22 in this case) sandwiched in between. Figure 14 shows a somewhat similar arrangement but with each transparency occupying an outside surface. In Figure 15 a pair of transparencies 22 and 24 have an air space in between them. The effect is that the stationary beam of light at the places where it is projected through the flicker areas of the slide 6 will be broken into a plurality of rays at the transparency 24 forming a multiple light-spot image slightly out of focus, and the movement of the interceptor will produce a flickering of these light spots. It is to be understood that protective layers of glass or the like such as 26 and 27 are used wherever considered necessary to protect the actual picture surfaces of the transparencies.

The interceptor 17 need not necessarily be an elongated cylinder nor must it necessarily rotate. It may be of prismatic, flat or other form to produce refraction or occultation, and may be designed to reciprocate at right angles to its axis. In another mode of execution it may be given a combination of reciprocal and rotary movements. Further, the beams of light emanating from the broken areas 25 need not be wholly intersected. An apertured movable shutter, for example, may be used in which the margin of the aperture is moved into and out of the cone of rays issuing through the composite slide.

The modified system as described with reference to Figures 9–16 including the two-dimensional supplemental transparency or/and the movable light interceptor which is designed specially for using a stationary light beam alone could very well be combined with the embodiment of the system according to Figures 1–8 in which a movable light beam is combined with the stationary beam. A variety of different flickering or animated effects can be given to parts of the image in this way. Particularly, it is to be understood that the movable refractive or occulting interceptor arrangement introduced by the embodiment according to Figures 9 and 16 could very well be applied to the composite slide of the first embodiment wherein three-dimensional projections r are employed instead of the flat form described herein at the area 25.

In the production of the composite slide, according to Figures 10–15, twin drawings are made from a master drawing, photograph or the like. "Drawing" throughout this specification means any picture, lettering, design or other representation used for advertising, instructional, display or other purposes. One of these drawings represents the whole picture or the like and is made photographically or otherwise into a diapositive to constitute the main transparency. The other drawing is a representation of only those areas of the master drawing which are intended to flicker, produced as lined or stippled areas in exact counterpart as to relative position, scale and outline design corresponding to the representation on the first transparency, and is also made into a diapositive by photography, engraving or other convenient process for the supplemental transparency. This supplemental transparency is placed closely against or adjacent the first transparency in spaced relationship either in front or behind as hereinbefore set forth, with its various lined or stippled areas in exact register with those parts of the whole picture contained on the first transparency which are intended to flicker. The two transparencies are secured together to form a composite slide unit with their prepared surfaces protected in any known or suitable manner.

Most existing and conventional projectors including the elements a, b, c (or 3) and d (or 4) can readily be converted to the invention by adapting them to use the composite slides f or 6 herein described, and adding the movable light refractive or occulting interceptor such as 17.

The animated image produced by the invention may be reproduced photographically by a cine-camera for subsequent cinematographic projection should it be desired to incorporate the same as a title or other part of such a projection.

I claim:

1. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light-modifying elements, a source of light, a condenser for condensing a beam of light from said source upon said slides so held in juxtaposition, focussing means for focussing upon the screen said beam after passage thereof through said slides, and light path distorting means for distorting the path of light from said source.

2. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light modifying elements, a source of light, a condenser for condensing a beam of light from said source upon said slides so held in juxtaposition, focussing means for focussing upon the screen said beam after passage thereof through said slides, and light path distorting means for distorting the path of light from said source, said focussing device being adjusted to sharply focus upon the screen the picture carried on said primary slide.

3. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light refracting elements, a source of light, a condenser for condensing a beam of light from said source upon said slides so held in juxtaposition, focussing means for focussing upon the screen said beam after passage thereof through said slides, and light path distorting means for distorting the path of light from said source.

4. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light refracting elements, a source of light, a condenser for condensing a beam of light from said source upon said slides so held in juxtaposition, focussing means for focussing upon the screen said beam after passage thereof through said slides, a focussing reflector, means for mounting said reflector rearwardly of said source with reference to said condenser and eccentrically rotatably with reference to the optical axis of said condenser and said focussing means for periodically varying the direction of reflected rays constituting a portion of the light incident upon said condenser, and means for rotating said reflector eccentrically about said axis.

5. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light modifying elements, a source of light, a condenser for condensing a beam of light from said source upon said slides so held in juxtaposition, focussing means for focussing upon the screen said beam after passage thereof through said slides, a light refracting member movably mounted in the path of the beam from said focussing means to the screen, and means for imparting motion to said member, said focussing device being adjusted to sharply focus upon the screen the picture carried on said primary slide.

6. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of embossed lenticular elements, a source of light, a condenser for condensing a beam of light from said source upon said slides so held in juxtaposition, focussing means for focussing upon the screen said beam after passage thereof through said slides, and light path distorting means for distorting the path of light from said source.

7. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of light refracting elements, a source of light, a condenser for condensing a beam of light from said source upon said slides so held in juxtaposition, focussing means for focussing upon the screen said beam after passage thereof through said slides, and light path distorting means for distorting the path of light from said source, said focussing device being adjusted to sharply focus upon the screen the picture carried on said primary slide.

8. In an apparatus for projecting upon a screen still pictures with parts thereof in apparent motion, a primary light-transmitting slide carrying a representation of a picture to be projected, a plurality of secondary light-transmitting slides having respective selected areas, corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slides comprising a plurality of light refracting elements, a source of light, a condenser for condensing a beam of light from said source upon said slides so held in juxtaposition, focussing means for focussing upon the screen said beam after passage thereof through said slides, and light path distorting means for distorting the path of light from said source.

9. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of spaced elemental opaque areas and interstitial clear spaces therebetween, a source of light, a condenser for condensing a beam of light from said source upon said slides so held in juxtaposition, focussing means for focussing upon the screen said beam after passage thereof through said slides, and light path distorting means for distorting the path of light from said source.

10. In an apparatus for projecting upon a screen still pictures with parts thereof in apparent motion, a primary light-transmitting slide carrying a representation of a picture to be projected, a secondary light-transmitting slide having selected areas corresponding to portions of the picture represented on said primary slide to which it is desired to impart apparent motion, holding means for holding said slides in spaced juxtaposition with said selected areas of said secondary slide in register with the corresponding portions of said primary slide, said selected areas of said secondary slide comprising a plurality of spaced elemental opaque areas and interstitial clear spaces therebetween, a source of light, a condenser for condensing a beam of light from said source upon said slides so held in juxtaposition, focussing means for focussing upon the screen said beam after passage thereof through said slides, a light refracting member movably mounted in the path of the beam from said focussing means to the screen, and means for imparting motion to said member, said focussing device being adjusted to sharply focus upon the screen the picture carried on said primary slide.

JOSEPH KÖNIG.